United States Patent
Hwang et al.

(10) Patent No.: US 7,742,644 B2
(45) Date of Patent: Jun. 22, 2010

(54) PROCESSING OF IMAGES IN IMAGING SYSTEMS

(75) Inventors: Hau Hwang, San Diego, CA (US); Hsiang-Tsun Li, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 11/414,044

(22) Filed: Apr. 27, 2006

(65) Prior Publication Data

US 2007/0165955 A1    Jul. 19, 2007

Related U.S. Application Data

(60) Provisional application No. 60/759,840, filed on Jan. 18, 2006.

(51) Int. Cl.
    *G06K 9/36*    (2006.01)
(52) U.S. Cl. .................................................. 382/232
(58) Field of Classification Search ......... 382/232–251, 382/303–304, 296–297; 375/240.01–240.27; 348/231.1–231.2, 400.1–425.3; 358/426.01–426.16, 358/468
See application file for complete search history.

(56) References Cited

U.S. PATENT DOCUMENTS

| | | | |
|---|---|---|---|
| 5,379,070 A * | 1/1995 | Retter et al. ............. | 375/240.2 |
| 6,219,457 B1 | 4/2001 | Potu | |
| 6,400,471 B1 * | 6/2002 | Kuo et al. .................... | 358/468 |
| 6,941,019 B1 * | 9/2005 | Mitchell et al. ............. | 382/232 |
| 7,301,568 B2 * | 11/2007 | Smith et al. .............. | 348/231.3 |
| 2002/0076115 A1 | 6/2002 | Leeder et al. | |
| 2003/0179937 A1 | 9/2003 | Brake et al. | |
| 2003/0215147 A1 | 11/2003 | Reichenbach et al. | |

FOREIGN PATENT DOCUMENTS

EP    1111904 A2    6/2001

OTHER PUBLICATIONS

International Search Report—PCT/US07/060649—International Search Authority, European Patent Office—Apr. 24, 2007.
Written Opinion—PCT/US07/060649—International Search Authority, European Patent Office—Apr. 24, 2007.
International Preliminary Report on Patentability—PCT/US07/060649—The International Bureau of WIPO, Geneva, Switzerland—Jul. 22, 2008.

* cited by examiner

*Primary Examiner*—Sherali Ishrat
(74) *Attorney, Agent, or Firm*—George C. Pappas; Espartaco Diaz Hidalgo

(57) ABSTRACT

The imaging system converts raw data for an image to formatted data concurrently with compressing the formatted data for the image. The exemplary imaging system includes an image processor for generating blocks of formatted data from raw image data. The exemplary imaging system also includes an image compressor for compressing the blocks of formatted data. The compressor compresses one or more of the blocks while the image processor generates one or more blocks of formatted data.

26 Claims, 6 Drawing Sheets

PROCESSING OF IMAGES IN IMAGING SYSTEMS

CLAIM OF PRIORITY UNDER 35 U.S.C. §119

The present Application for Patent claims priority to Provisional Application No. 60/759,840 entitled Low Latency and Memory Efficient Image Capture and JPEG Encoding System," filed on Jan. 18, 2006, assigned to the assignee hereof, and hereby expressly incorporated by reference herein in its entirety.

BACKGROUND

1. Field

The present invention relates generally to imaging systems and more particularly to processing image data in imaging systems.

2. Background

Imaging devices such as digital cameras typically include an image sensor that generates raw image data. The imaging device converts the raw image data to a format such as the YCbCr format. The formatted data is then compressed to a size suitable for storage. The process of formatting and compressing is a source of the delay between when pictures can be taken by the imaging device. For instance, the camera is often unable to take a second image because the camera is processing the data for a first image. As a result, there is a need for improved processing of image data.

SUMMARY

An imaging system converts raw data for an image to formatted data concurrently with compressing the formatted data for the image. The exemplary imaging system includes an image processor for generating blocks of formatted data from raw image data. The exemplary imaging system also includes an image compressor for compressing the blocks of formatted data. The compressor compresses one or more of the blocks while the image processor generates one or more blocks of formatted data.

An embodiment of the imaging system includes an image processor configured to format raw data for an image into blocks of YCbCr data and sequentially write the blocks of YCbCr data to a memory. Each block of YCbCr data is partitioned into a plurality of minimum code units (MCUs). The system also includes a JPEG encoder configured to sequentially read the blocks of YCbCr data from the memory. The JPEG encoder encodes the minimum code units (MCUs) in the block so as to generate one or more bitstream segments that each include a re-start marker and one or more unit bitstreams. Each unit bitstream is a JPEG encoded bitstream for one of the minimum code units (MCUs) in the block. The minimum code units in a block are compressed in a sequence that changes as a desired degree of image rotation changes. Additionally, the minimum code units are JPEG encoded concurrently with the raw data being formatted. The system also includes electronics for assembling the bitstream segments into an image bitstream from which the image can be regenerated.

DETAILED DESCRIPTION

In accordance with an exemplary embodiment, an imaging system includes an image processor configured to format raw data for an image into blocks of formatted data. The system also includes a compressor configured to sequentially compress the blocks of data. The ability to sequentially compress blocks of data allows formatting less than the entire image before the compressor begins compression. As a result, the compressor can compress blocks of data concurrently with the image processor formatting blocks of data. The ability to compress blocks of formatted data concurrently with formatting of the data reduces the delay between the generations of images. In an imaging system such as a digital camera, compressing image data concurrently with formatting of image data reduces the time between when pictures can be taken.

Imaging systems often rotate images for purposes such as portrait or landscape applications. Compressing blocks of formatted data can also support image rotations. The blocks of formatted data can be partitioned into units such as the minimum code units (MCUs) employed in JPEG compression. The sequence in which the compressor compresses the units in a block can be changed as the desired degree of image rotation changes. As a result, even when the image is rotated, the entire image does not need to be formatted before the compressor begins compression.

Compressing blocks of formatted data can also reduce the memory requirements of the imaging system. For instance, the imaging system can include a memory to which the image processor writes the formatted data blocks and from which the compressor reads the formatted data blocks. The memory can include a ping-pong buffer having a plurality of buffers. The image processor can alternate the buffer to which it writes each formatted data block. Additionally, the compressor can alternate the buffer from which it receives each formatted data block. As a result, the memory can hold only two blocks of formatted data rather than formatted data for the entire image. Since the formatted data for the entire image is not written to memory, the memory requirements may be reduced.

Figure 1:
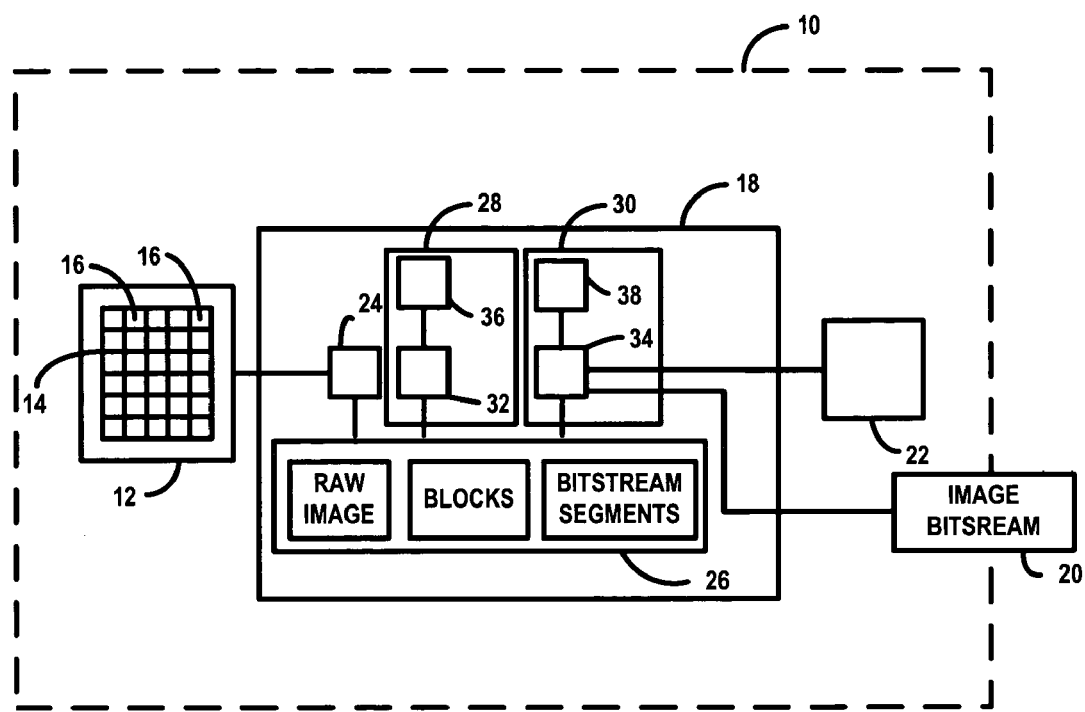
FIG. 1 is a block diagram of an imaging system in accordance with an exemplary embodiment.

FIG. 1 is a block diagram of an imaging system 10. The imaging system 10 includes an image sensor 12 having an array of pixels 14 that are each associated with a light sensor 16. In some instances, the pixels 14 are arranged in two-dimensional array of columns and rows. Examples of image sensors 12 include, but are not limited to, CMOS (Complimentary Metal Oxide Semiconductor) sensor chips and CCD (Charge Coupled Device) sensor chips.

The imaging system 10 includes electronics 18 in communication with the image sensor 12. When generating an image, the electronics 18 receive sensor values from the sensors 16 in the image sensor 12. The electronics 18 process the sensor values so as to generate a compressed image bitstream. The electronics 18 can store the image bitstream in a supplemental memory 20 and/or in a memory included in the electronics 18. The supplemental memory 20 can be any memory device or combination of memory devices suitable for write operations such as storing images and data. Although the supplemental memory 20 is shown as being part of the imaging system 10, the supplemental memory 20 can be outside of the imaging system 10 or can be removably coupled to the imaging system 10. A Memory Stick® employed in conjunction with digital cameras is an example of a supplemental memory 20 that can be removably coupled to the imaging system 10.

The imaging system 10 can employ the image bitstream to regenerate the image. The imaging system 10 can display the image on one or more output devices 22. Suitable output devices 22 include, but are not limited to, printers, transmitters, networks such as the Internet, and displays such as camera displays, video phone displays, video screens, and computer screens. Although the output device 22 is shown as being part of the imaging system 10, the output devices 22 and/or supplemental memory can be outside of the imaging system 10 or can be removably coupled to the imaging system 10.

The electronics 18 include a sensor interface 24 in communication with the image sensor 12 and with a memory 26. The memory 26 can be any memory device or combination of memory devices suitable for read/write operations such as storing images and data associated with images. The memory 26 can operate as a common pool memory. The camera interface is configured to extract the raw image data from the image sensor 12 and to store the raw image data in the memory 26. The electronics 18 also include an image processor 28 in communication with the memory 26. The image processor 28 is configured to format the raw image data and write the formatted data to the memory 26. An example of an image format employed by the image processor 28 includes, but is not limited to, YCbCr format. The electronics 18 also include a compressor 30 in communication with the memory 26, the output device 22 and the optional supplemental memory 20. The compressor 30 compresses the formatted data stored in the memory 26 so as to generate the image bitstream. The image bitsream can be stored in the memory 26 and/or in the supplemental memory 20.

The image processor 28 includes a first processor 32 and the compressor 30 includes a second processor 34. Suitable processors for use as the first processor 32 and/or the second processor 34 include, but are not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The first processor 32 and/or the second processor 34 may also be implemented as a combination of computing devices, e.g., a combination of a DSP and a microprocessor, a plurality of microprocessors, one or more microprocessors in conjunction with a DSP core, or any other such configuration. The first processor 32 and the second processor 34 can be the same type of processor or a different type of processor. Suitable image processors 28 include, but are not limited to, video front end hardware. Suitable compressors 30 include, but are not limited to, JPEG encoders.

FIG. 1 shows the first processor 32 in communication with a first signal-bearing medium 36 and the second processor 34 in communication with a second signal-bearing medium 38. Instructions for actions to be executed by the first processor 32 can be encoded on the first signal-bearing medium 36. Instructions for actions to be executed by the second processor 34 can be encoded on the second signal-bearing medium 38. As noted above, a variety of different components can serve as the first processor 32 and/or the second processor 34. Depending on the choice of first processor 32 and second processor 34, the first signal-bearing medium 36 and/or the second signal-bearing medium 38 may not be required. Accordingly, the first signal-bearing medium 36 and/or the second signal-bearing medium 38 may be optional. Although the first signal-bearing medium 36 and the second signal-bearing medium 38 are shown as being separate from the memory 26, the memory 26 can serve as the first signal-bearing medium 36 and/or as the second signal-bearing medium 38.

Suitable signal-bearing media for use as the first signal-bearing medium 36 or the capture signal-bearing medium include, but are not limited to, optical discs such as CDs, magnetic storage diskettes, Zip disks, magnetic tapes, RAMs, and ROMs. In some instances, the first signal-bearing medium 36 and/or the second signal-bearing medium 38 is located outside of the imaging system 10. For instance, the signal-bearing medium can be connected to a server computer on a computer network.

Examples of suitable imaging systems 10 include, but are not limited to, digital cameras, video cameras, mobile camera phones, medical imaging devices. The imaging system 10 can also be a computer system configured to store image data. Examples of suitable computer systems include, but are not limited to, a personal computers and servers. In some instances, the imaging system 10 does not include the image sensor 12. For instance, when the imaging system 10 is a computer system, the image sensor 12 is not necessarily included in the imaging system 10. When the image sensor 12 is not included in the imaging system 10, the image sensor 12 can be independent from the imaging system 10 but can be placed in communication with the imaging system 10 to permit the electronics 18 to receive the sensor values.

Figure 2:
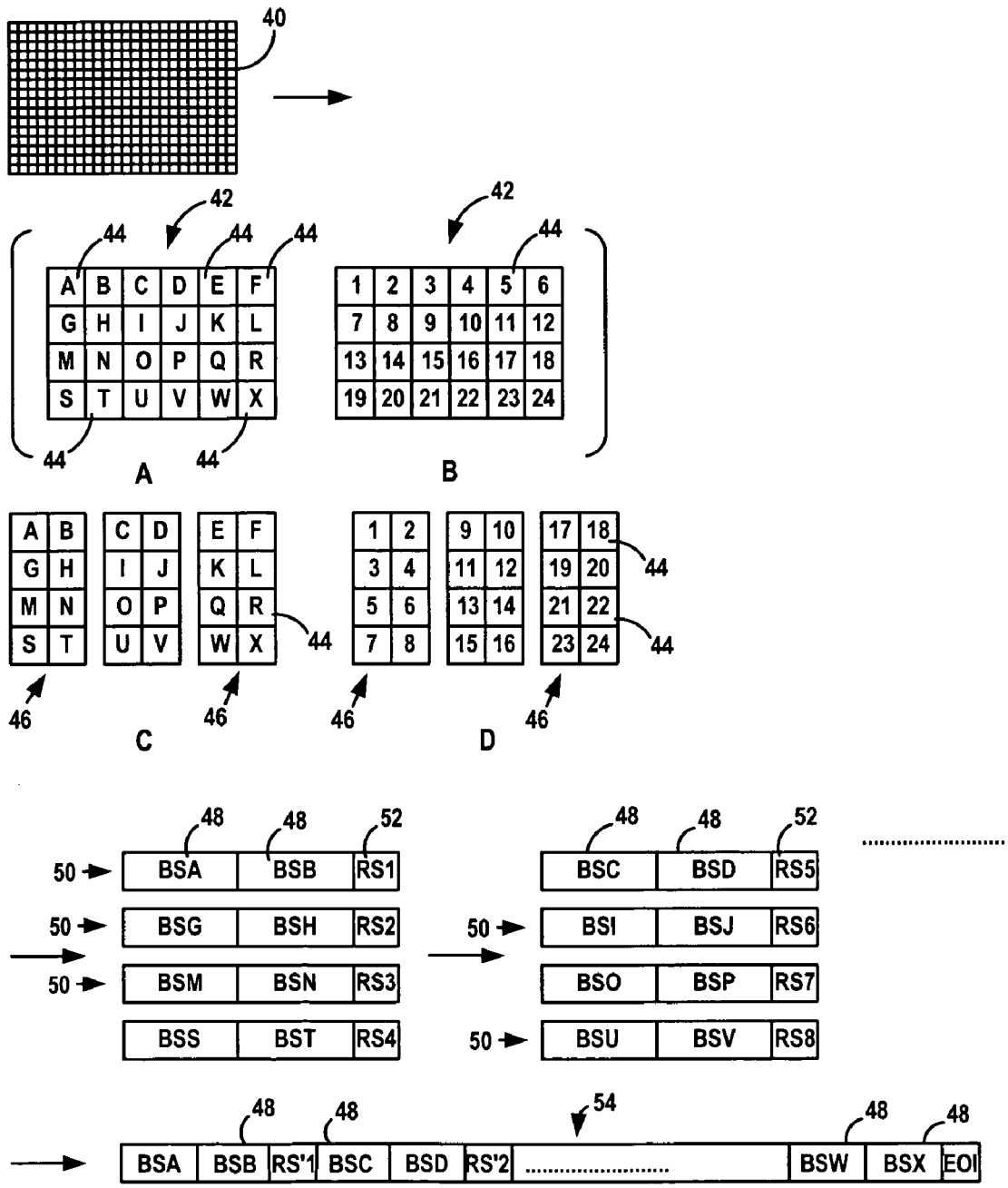
FIG. 2 illustrates progression of image data through an imaging system when the image is not rotated.

FIG. 2 illustrates progression of data through the imaging system of FIG. 1. The sensor interface stores the raw image data 40 from the image sensor in the memory. The raw image data 40 associates a sensor value from each of the sensors in the image sensor with a pixel in the image sensor. Since one or more pixels in the image sensor are associated with a pixel in the image, the raw image data 40 effectively associates one or more sensor values with a pixel in the image.

The image processor reads the raw image data 40 from the memory and formats the raw image data 40 for compression. For instance, the image processor can format the raw image data 40 for JPEG compression by converting the raw image data 40 to YCbCr format. In the YCbCr format, Y, Cb, and Cr each represent a different component of the image. For instance, Y represents luminescence component while Cb and Cr each represent chrominance components.

The formatted data 42 is partitioned into a plurality of units 44 that each contain data for a plurality of pixels in the image. Diagram A in FIG. 2 represents an image with formatted data 42 partitioned into a plurality of units 44 that are each given a label A through X.

The units 44 can be the minimum code units (MCUs) employed in conjunction with JPEG compression. An MCU has dimensions of $H_{max}*8$ pixels by $V_{max}*8$ pixels, where $H_{max}$ and $V_{max}$ are integers that are equal to one or more and the pixels are the pixels in an image. The value of $H_{max}$ and $V_{max}$ are determined by the sampling frequency for the different data components. As an example, when YCbCr formatting is used, the data from a 2×2 square of pixels in an image are often averaged for the Cb and the Cr component while the data for the Y component is not averaged. $H_{max}$ and $V_{max}$ are selected to have the smallest possible values while the data in an MCU for each of the different components was generated for the same group of pixels in the image. Accordingly, for the above example, the MCU would be 16 by 16. Common MCU dimensions include 8 by 8, 8 by 16, 16 by 8 and 16 by 16.

The image processor formats the raw data in blocks 46 that each include a plurality of the units. For instance, diagram C represents the image of diagram A partitioned into three blocks 46 that each include eight units 44. The image processor can generate the formatted data 42 for each block 46 in series. For instance, the image processor can read from the memory the raw data for the first block 46, convert the raw data to formatted data 42 and write the formatted data 42 to the memory. After writing the formatted data 42 for a block 46 to the memory, the image processor can generate the formatted data 42 for the next block 46 in the series. The image processor in many cameras does not have enough input and output capacity to efficiently handle the entire image. However, these image processors may be effective when formatting blocks of data rather than the entire image.

The compressor receives the formatted data 42 for a block 46 from the memory. For instance, the diagram D in FIG. 2 illustrates the sequence that the compressor compresses the units 44 in each of the blocks 46. The compressor compresses the formatted data 42 for the unit A, followed by the unit B, followed by the unit G, and so on. Diagram B illustrates the sequence that the units 44 are present in the image bitstream 54. For instance, the image bitstream includes data for the unit A, followed by unit B, followed by unit C. Comparison of diagram B and diagram D shows that the sequence of the units 44 in the image bitstream 54 is different from the sequence in which the units 44 are compressed.

The compressor employs re-start markers 52 to compensate for the difference between the sequence of the units 44 in the image bitstream 54 and the sequence in which the units 44 are compressed. For instance, the compressor compresses the units 44 in the order shown in the diagram D. Compression of a unit 44 results in a unit bitstream 48. The unit bitstream 48 for the unit C is labeled BSC in FIG. 2. The unit bitstreams 48 from different units 44 are combined in a bitstream segment 50 having unit bitstreams 48 arranged in a sequence according to diagram D. When progression through the units 44 in the sequence specified in diagram D results in a change from the sequence specified in diagram B, a restart marker is included in the bitstream segment 50. For instance, diagram D specifies that unit G is compressed, then H, then M; however, diagram B specifies that unit G is compressed, then H, then I. Since the sequence in diagram D diverges from the sequence in diagram B after unit H, a re-start marker 52 is placed after the unit bitstream 48 for unit H. As a result, the compressor generates a bitstream segment 50 having compressed data for the unit A, the unit B and a first re-start marker 52 labeled RS1 and a bitstream segment 50 having compressed data for the unit G, the unit H and a first re-start marker labeled RS2. A re-start marker 52 is also included in a bitstream segment 50 after the last unit 44 in a block 46 is compressed. For instance, a re-start marker 52 is placed after the unit bitstream 48 for unit T. The compressor starts another bitstream segment 50 after a re-start marker 52. The compressor stores the bitstream segments 50 in the memory. Although FIG. 2 illustrates each of the bitstream segments 50 as being separated from one another, the bitstream segments 50 can be positioned end-to-end in the memory. The re-start markers 52 can include sequential numerical labels so they can be sequentially identified during subsequent processing.

In certain compression methods, the compressed data for a particular unit 44 is a function of the preceding unit 44 where preceding unit 44 is determined in accordance with the numbers on the diagram B in FIG. 2. For instance, the JPEG data for the unit C in FIG. 2 is a function of the JPEG data for the unit B. In particular, JPEG encoding makes use of coefficients that are commonly called AC coefficients and a DC coefficient. The DC coefficient for the unit C indicates the difference between the DC component for the unit C and the unit B. Accordingly, the value of the DC component for the MCU labeled B must be known in order to determine the value of the DC component for the MCU labeled C. When generating the unit bitstream 48 for units G, M, and S, the compressor does not have access to the compressed data for the preceding units. As a result, the unit 44 compressed after a re-start marker 52 can be treated as the first unit 44 of an image. For instance, the unit G can be treated the same as the unit A. In particular, JPEG encoding sets the DC prediction for the first MCU to zero. Accordingly, the compressor can set the DC prediction for unit G to zero.

After the compressor writes each of the bitstream segments 50 for a block 46 to the memory, the compressor retrieves the formatted data 42 for the next block 46 from the memory. The compressor compresses the formatted data 42 for the units 44 in the next block 46 and writes the bitstream segments 50 to the memory. The compressor employs the above process to proceed through each of the blocks 46 and places an end-of-image marker after the unit bitstream 48 for unit X.

Compressing and formatting blocks of data rather than the entire image can reduce the memory requirements of the imaging system. For instance, the formatted data blocks 46 can be written to a ping-pong buffer included in the memory. The ping-pong buffer can include a plurality of buffers and the image processor can alternate the buffer to which it writes each formatted data block 46. Additionally, the compressor can alternate the buffer from which it receives each formatted data block 46. As a result, the compressor can read formatted data 42 from one buffer while the image processor is writing data to the other buffer. Since this method of transferring formatted data between the image processor and the compressor does not require that the entire image be written to memory, this method can reduce the memory required by the imaging device.

The compressor employs each of the bitstream segments 50 to assemble the image bitstream 54. The image bitstream 54 is assembled so the compressed data for each unit 44 is arranged in the sequence shown in the diagram B. For instance, the compressor can find the first re-start marker and use the bitstream segment that includes the first re-start marker to start the image bitstream 54. The compressor can continue the image bitstream 54 using the bitstream segment incuding the fifth re-start marker and then the bitstream segment including the ninth re-start marker, and so on. The re-start markers in the bitstream segments can be included in the image bitstream. When the re-start markers are included in the image bitstream, the re-start markers can be re-numbered to reflect the correct sequence of the bitstream segments in the image bitstream. For instance, since the bitstream segment including the fifth re-start marker, RS5, is the second bitstream segment in the image bitstream, RS5 can be re-numbered as the second re-start marker in the image bitstream, RS'2. The second processor in the compressor can assemble the bitstream segments 50. Alternately, the compressor or the electronics can include a third processor that assembles the bitstream segments 50.

Figure 3:
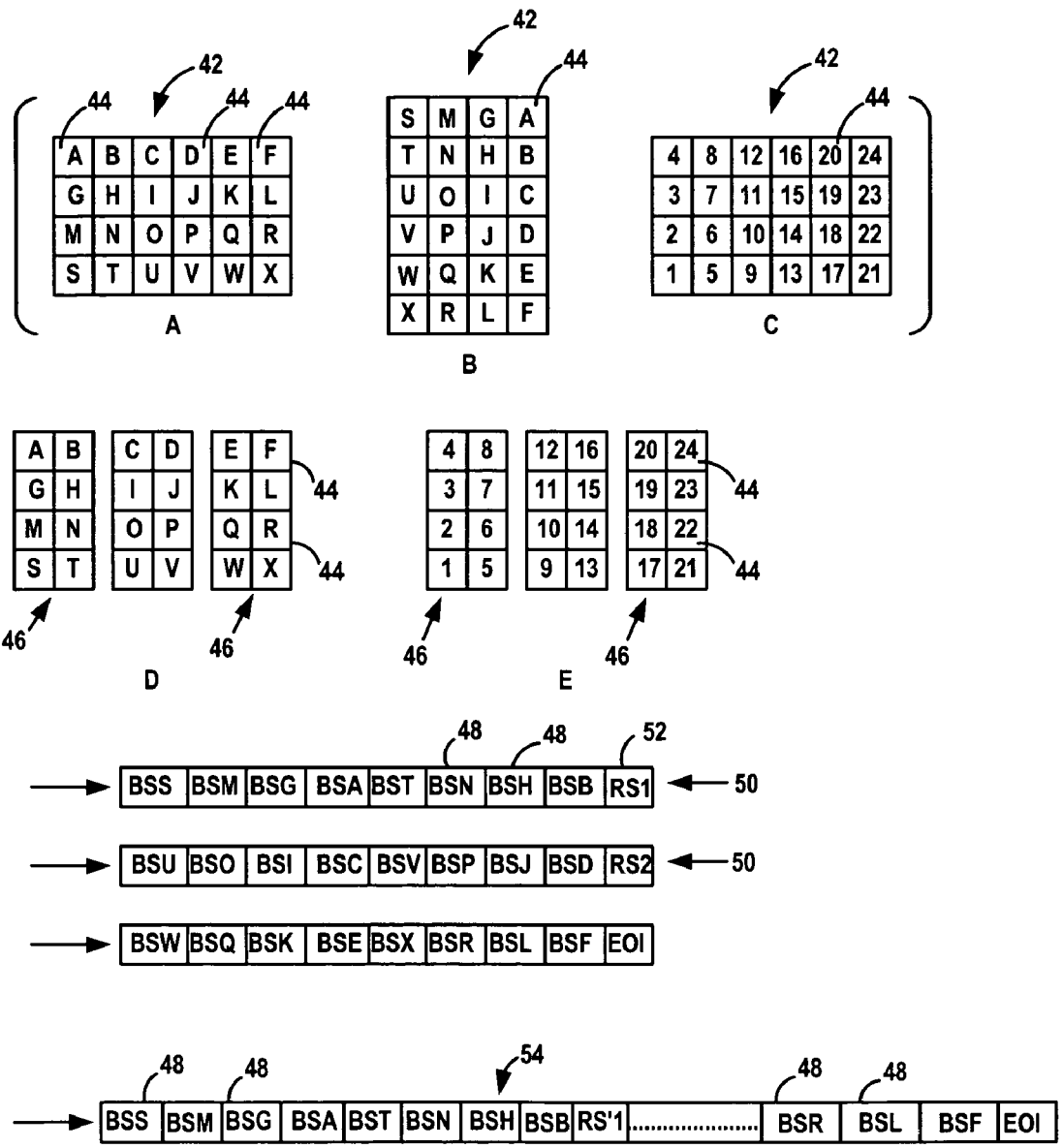
FIG. 3 illustrates progression of data through an imaging system when the image is rotated 90°.

The compressor can use the blocks 46 from FIG. 2 to rotate the image to different orientations. FIG. 3 illustrates the progress of the image data through the imaging system when a 90° clockwise rotation is desired. The diagram A illustrates the original image and is the same as the diagram A in FIG. 2. The diagram B illustrates the image illustrated by the diagram B rotated 90° clockwise. Many compression schemes, such as JPEG compression, produce a bitstream having the units 44 arranged in row major order. Accordingly, to produce an image rotated as shown in the diagram B, these compression schemes produce a bitstream with data for unit S, then unit M, then unit G, then unit A, then unit T, and so on. The diagram C indicates this sequence applied to the diagram A. Accordingly, the diagram C indicates the sequence that data from each of the units in the diagram A are arranged in the bitstream in order to produce the 90° rotation.

As noted above, the image processor writes formatted data blocks 46 to the memory. The diagram D in FIG. 3 illustrates an example of the blocks 46 that could be created for the image illustrated the diagram A. The compressor reads the data for a block 46 from the memory and compresses the units 44 in a block 46. When compressing each unit 44, the compression is performed so as to rotate the data in the unit 44 by the desired rotation of the image, 90° clockwise rotation in this instance. A variety of techniques can be employed to rotate the individual units 44. For instance, the compressor can shuffle the locations of the pixels in each unit 44 such that the unit 44 is rotated the desired amount before compressing the unit 44. Accordingly, the data in a unit bitstream 48 is for a unit 44 that is rotated by the desired rotation.

The diagram E illustrates the sequence in which the compressor compresses the units 44 in each of the blocks 46. As noted above, compression of a unit 44 results in a unit bitstream 48. The unit bitstream 48 for unit C is labeled BSC. The unit bitstreams 48 from different units 44 are combined in a bitstream segment 50 having the compressed bistreams arranged in the sequence specified in diagram E. When progression through the units 44 in the sequence specified in diagram E results in a change from the sequence specified in diagram C, a restart marker is included in the bitstream segment 50. A re-start marker 52 is also included in a bitstream segment 50 after the last unit 44 in a block 46 is compressed. In this instance, the sequence in each of the blocks 46 corresponds to the sequence specified in diagram C. As a result, re-start markers 52 are only placed after the unit bitstream 48 for unit B. Accordingly, the compressor generates a bitstream segment 50 having compressed data for the units S, M, G, A, T, N, H and B in that order and a first re-start marker labeled RS1. The compressor starts another bitstream segment 50 after a re-start marker 52. The compressor stores the bitstream segments 50 in the memory. Although FIG. 3 illustrates a single bitstream segment 50 resulting from compression of the first block 46, the block 46 can be divided into multiple bitstream segments 50. For instance, re-start markers 52 can be positioned after the unit bitstreams 48 for unit A and also for unit B.

After the compressor writes each of the bitstream segments 50 for a block 46 to the memory, the compressor retrieves the formatted data 42 for the next block 46 from the memory. The compressor compresses the formatted data 42 for the units 44 in the next block 46 and writes the bitstream segments 50 to the memory. The compressor employs the above process to proceed through each of the blocks 46 and places and end-of-image marker after the unit bitstream 48 for unit F.

The blocks 46 in the diagram D in FIG. 3 are the same as the blocks 46 in the diagram C in FIG. 2. However, the sequence illustrated in the diagram E in FIG. 3 is different from the sequence illustrated in the diagram D in FIG. 2. The change in sequence provides the rotation of the image that results from the process illustrated FIG. 3 but does not result from the process illustrated in FIG. 2. Accordingly, the sequence in which the compressor compresses the units 44 is a function of the desired degree of image rotation.

The compressor employs each of the bitstream segments 50 to assemble the image bitstream 54. The image bitstream 54 is assembled so the compressed data for each unit 44 is arranged in the sequence shown in the diagram C. For instance, the compressor can find the first re-start marker and use the bitstream segment that includes the first re-start marker to start the image bitstream 54. The compressor can continue the image bitstream 54 using the bitstream segment that includes the second re-start marker and so on. The re-start markers in the bitstream segments can be included in the image bitstream. When the re-start markers are included in the image bitstream, the re-start markers can be re-numbered to reflect the correct sequence of the bitstream segments in the image bitstream.

The bitstream segments 50 associated with FIG. 3 are assembled starting with the bitstream segment that includes the first re-start marker followed by the bitstream segment that includes the second re-start marker, followed by the bitstream segment that includes the third re-start marker, and so on. In contrast, the bitstream segments 50 associated with FIG. 2 were assembled by using the bitstream segment that includes the first re-start marker followed by the bitstream segment that includes the fifth re-start marker, followed by the bitstream segment that includes the ninth re-start marker, and so on. Accordingly, the sequence in which the bitstream segments 50 are assembled is different for FIG. 2 than for FIG. 3. The difference in the sequencing results from the different degrees of image rotation in FIG. 3 and FIG. 2. Accordingly, the sequence in which the bitstream segments 50 are assembled can be a function of the desired degree of image rotation.

Figure 4:
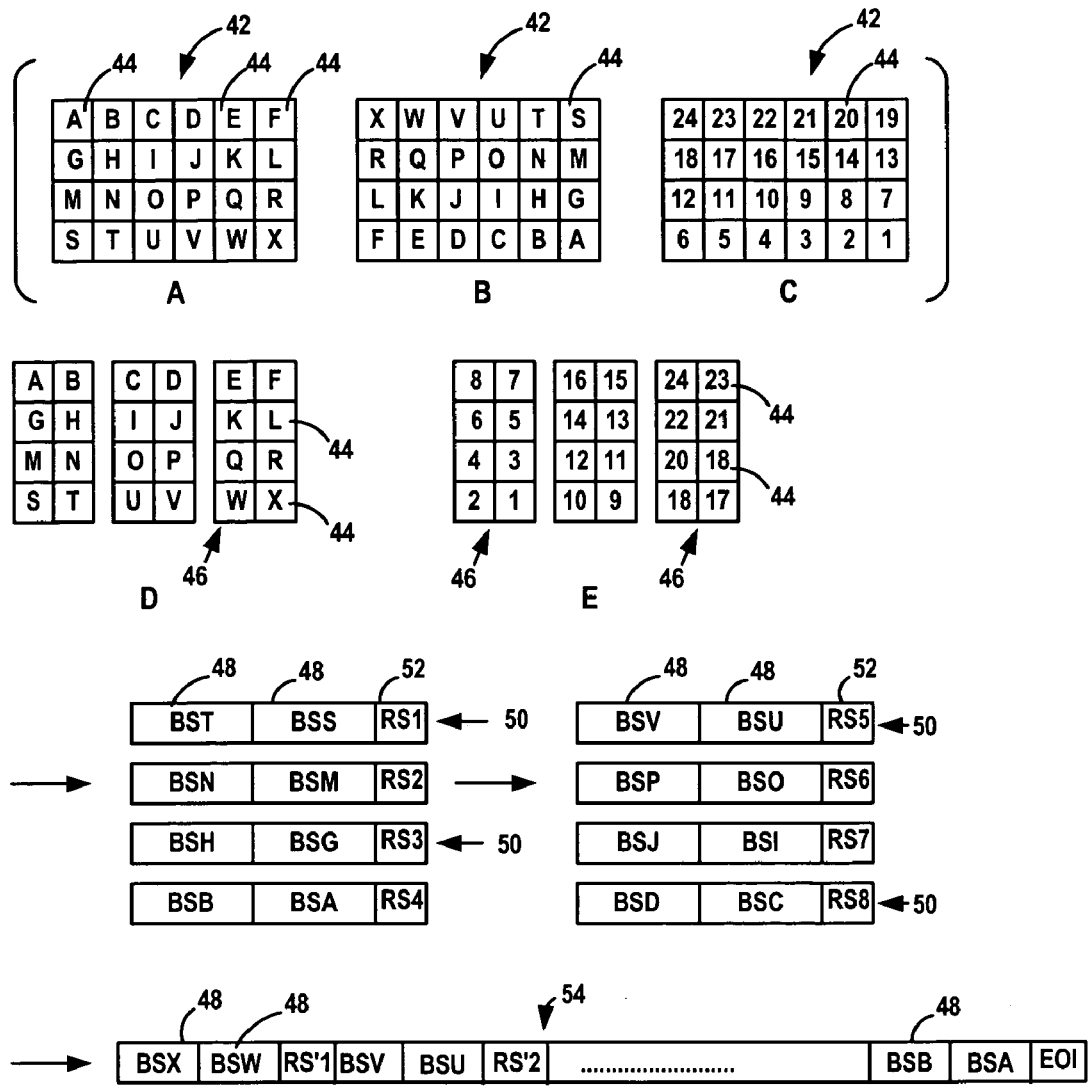
FIG. 4 illustrates progression of data through an imaging system when the image is rotated 180°.

FIG. 4 illustrates progression of data through the imaging system when the image is to be rotated 180°. The diagram A illustrates the original image and is the same as the diagram A in FIG. 2. The diagram B illustrates the image illustrated by the diagram B rotated 180° clockwise. Many compression schemes, such as JPEG compression, produce a bitstream having the units 44 arranged in row major order. Accordingly, to produce an image rotated a shown in the diagram B, these compression schemes produce a bitstream with data for units X, W, V, T, S, R, and so on, in that order. The diagram C indicates this sequence applied to the diagram A. Accordingly, the diagram C indicates the sequence that the data for each of the units 44 in the diagram A is arranged in the bitstream produced by one of these compression schemes in order to achieve the 180° rotation.

As noted above, the image processor writes formatted data blocks 46 to the memory. The diagram D in FIG. 4 illustrates an example of the blocks 46 that could be created for the image illustrated the diagram A. The compressor reads the data for a block 46 from the memory and compresses the units 44 in a block 46. When compressing each unit 44, the compression is performed so as to rotate the data in the unit 44 by the desired rotation of the image, 180° clockwise rotation in this instance. A variety of techniques can be employed to rotate the individual units 44. For instance, the compressor can shuffle the locations of the pixels in each unit 44 such that the unit 44 is rotated the desired amount before the compressing unit 44. Accordingly, the data in a unit bitstream 48 is for a unit 44 that is rotated by the desired rotation.

The diagram E in FIG. 4 illustrates the sequence in which the compressor compresses the units 44 in each of the blocks 46. As noted above, compression of a unit 44 results in a unit bitstream 48. The unit bitstream 48 for unit C is labeled BSC. The diagram E in FIG. 4 illustrates the sequence in which the compressor compresses the units 44. The unit bitstreams 48 from different units 44 are combined in a bitstream segment 50 having the compressed bistreams arranged in the sequence specified in diagram E. When progression through the units 44 in the sequence specified in diagram E results in a change from the sequence specified in diagram C, a restart marker is included in the bitstream segment 50. For instance, diagram E specifies that unit N is compressed, then M, then H; however, diagram C specifies that unit N is compressed, them M, then L. Since the sequence in diagram E diverges from the sequence in diagram C after unit M, a re-start marker 52 is placed after the unit bitstream 48 for unit M. As a result, the compressor generates a bitstream segment 50 having compressed data for the unit T, the unit S and a first re-start marker labeled RS1 and a bitstream segment 50 having compressed data for the unit N, the unit M and a second re-start marker labeled RS2. A re-start marker 52 is also included in a bitstream segment 50 after the last unit 44 in a block 46 is compressed. For instance, a re-start marker 52 is placed after the unit bitstream 48 for unit A. The compressor starts another bitstream segment 50 after a re-start marker 52. The compressor stores the bitstream segments 50 in the memory. Although FIG. 4 illustrates each of the bitstream segments 50 as being separated from one another, the bitstream segments 50 can be positioned end-to-end in the memory. The re-start markers 52 can include sequential numerical labels so they can be sequentially identified during subsequent processing.

After the compressor writes each of the bitstream segments 50 for a block 46 to the memory, the compressor retrieves the formatted data 42 for the next block 46 from the memory. The compressor compresses the formatted data 42 for the units 44 in the next block 46 and writes the bitstream segments 50 to the memory. The compressor employs the above process to proceed through each of the blocks 46 and places and end-of-image marker after the unit bitstream 48 for unit F.

The blocks 46 in the diagram D in FIG. 4 are the same as the blocks 46 in the diagram C in FIG. 2 and the same as the blocks 46 in the diagram D in FIG. 3. However, the sequence that the units 44 in these blocks 46 are compressed as illustrated by diagram E in FIG. 4 is different from the sequence illustrated in diagram E in FIG. 3 and also different from the sequence illustrated in diagram D in FIG. 2. The change in sequence provides the different degrees of rotation resulting from the processes illustrated in FIG. 2, FIG. 3 and FIG. 4. Accordingly, the sequence in which the compressor compresses the units 44 is a function of the desired degree of image rotation.

The compressor employs each of the bitstream segments 50 to assemble the image bitstream 54. The image bitstream 54 is assembled so the compressed data for each unit 44 is arranged in the sequence shown in the diagram C. For instance, the compressor can find the ninth re-start marker and use the bitstream segment that includes the ninth re-start marker as the start of the image bitstream 54. The compressor can continue the image bitstream 54 using the bitstream segment that includes the fifth re-start marker, then the bitstream segment that includes the first re-start marker, then the bitstream segment that includes the tenth re-start marker, and so on. The re-start markers in the bitstream segments can be included in the image bitstream. When the re-start markers are included in the image bitstream, the re-start markers can be re-numbered to reflect the correct sequence of the bitstream segments in the image bitstream. For instance, since the bitstream segment including the ninth re-start marker, RS9, is the first bitstream segment in the image bitstream, RS9 can be re-numbered as the first re-start marker in the image bitstream, RS'1. Further, the fifth re-start marker, RS5, can be re-numbered as the second re-start marker in the image bitstream, RS'2.

The bitstream segments 50 associated with FIG. 4 are assembled starting with the bitstream segment that includes the ninth re-start marker followed by the bitstream segment that includes the fifth re-start marker, followed by the bitstream segment that includes the first re-start marker, and so on. In contrast, the bitstream segments 50 associated with FIG. 2 were assembled by using unit bitstreams 48 associated with the first re-start marker followed by the unit bitstreams 48 associated with the fifth re-start marker, followed by the unit bitstreams 48 associated with the ninth re-start marker, and so on. Accordingly, the sequence in which the bitstream segments 50 are assembled is different for FIG. 2 than for FIG. 4. The difference in the sequencing results from the different degrees of image rotation in FIG. 4 and FIG. 2. Accordingly, the sequence in which the bitstream segments 50 are assembled can be a function of the desired degree of image rotation.

Figure 5:
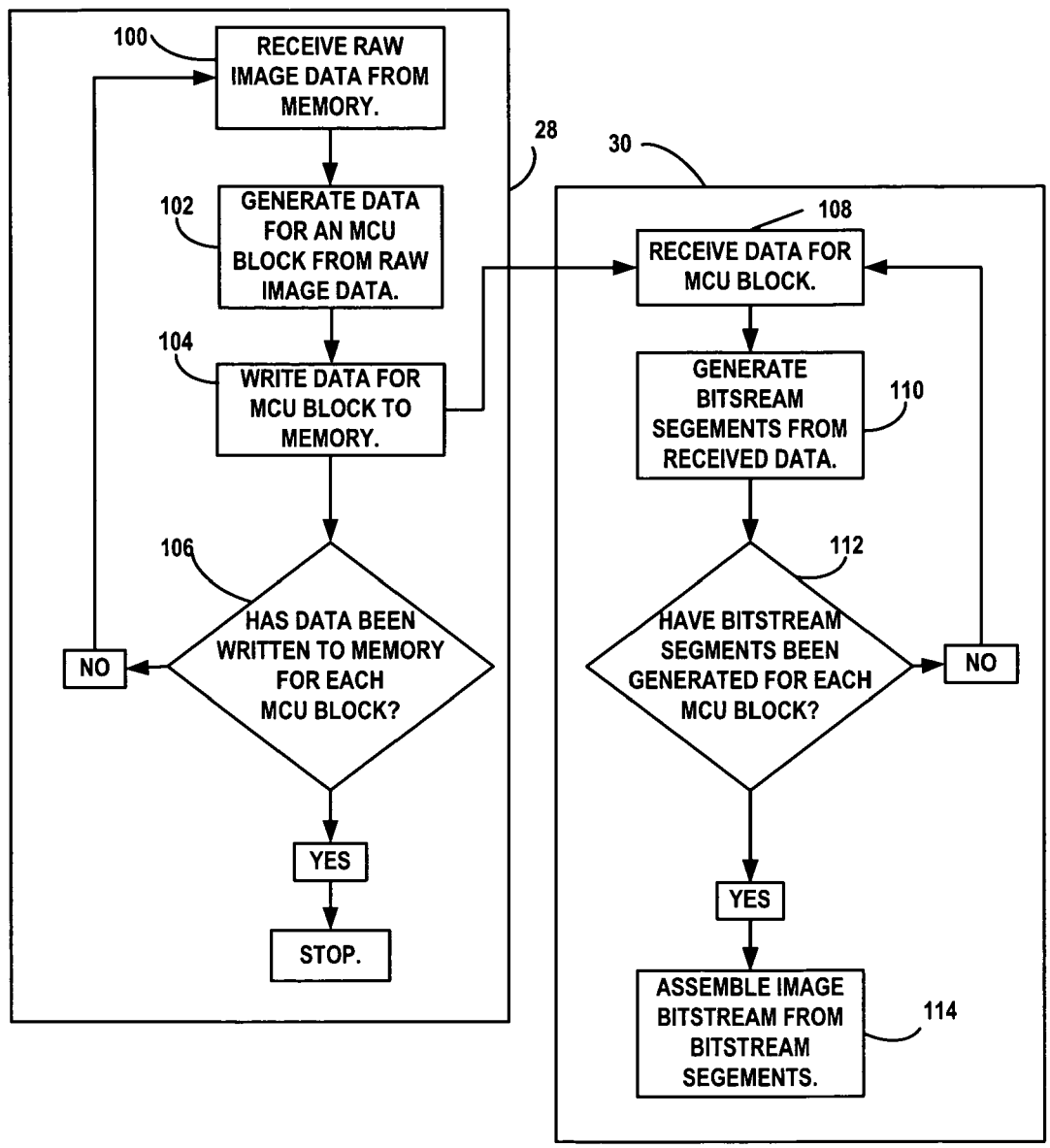
FIG. 5 is a flow diagram illustrating a method of processing image data.

FIG. 5 is a flow diagram illustrating a method of processing image data. Raw image data for a block 46 is received from a memory at process block 100. For instance, the image processor can receive the raw image data for one of the blocks from the memory. The raw image data is formatted at process block 102. For instance, the image processor can convert the raw image data to YCbCr format. At process block 104, the formatted data for a block is written to a memory. For instance, the image processor can write the formatted block of data to the buffer of a ping-pong buffer. At determination block 106, a determination is made whether formatted data for each of the blocks has been written to the memory. When the determination is no, the method returns to process block 100 and when the determination is positive this portion of the method can be stopped.

At process block 108, a block of the formatted data stored in the memory is received. For instance, the compressor can receive a block of the formatted data from a buffer in a ping-pong buffer. At process block 110, the one or more bitstream segments are generated from the block of formatted data. For instance, the compressor can compress units 44 in the block of formatted data to generate the one or more bitstream segments from the block of formatted data. In particular, the compressor can perform JPEG compression on the units 44 in the block of formatted data to generate the one or more bitstream segments. In some instances, compressing a unit 44 of the formatted data includes compressing the unit 44 of data such that the compressed data for the unit 44 is for a version of the unit 44 that is rotated relative to the formatted data for the unit 44.

At determination block 112, a determination is made whether bitstream segments have been generated for each block of formatted data. When the determination is no, the method returns to process block 108 and when the determination is yes, the method can continue to process block 114. At process block 114, the bitstream segments are assembled into an image bitstream. The image bitstream can be stored in the memory and/or in the supplemental memory.

The blocks illustrated in FIG. 5 can be different from the actual execution of the method. For instance, different blocks can be performed concurrently or alternated with one another. As an example, process block 102 and 104 can be performed concurrently or alternated. In particular, data can for a block can be formatted while other data from the same block is written to memory or the formatting of data from the block can be alternated with storage of the data from the block. As another example, process block 108 and 110 can be performed concurrently or alternated. In particular, bitstream segments can be generated for a particular block while additional data for the same block is received from memory or the bitstream generation can be alternated with receiving the formatted data for the block. Further, decision blocks can be executed though the use of loops in software programming.

Figure 6:
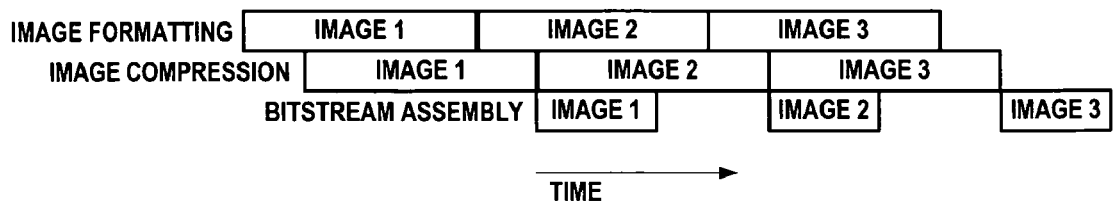
FIG. 6 illustrates a possible allocation of components in the imaging system over time.

Different portions of the method illustrated in FIG. 5 can be executed concurrently. For instance, after the first block of formatted data has been written to the memory, the bitstream segments can be generated from the first block and from the subsequent blocks that are written to the memory. Additional blocks can be formatted while the bitstream segments are generated from the first and subsequent blocks. As an example, FIG. 6 illustrates a possible allocation of the components in the electronics over time. The image processor begins formatting the first image. After formatting the first block, the compressor begins compressing the first block and subsequent blocks. The image processor continues to format subsequent blocks while the compressor is compressing the first block and subsequent blocks. Since the image processor finishes processing the data before the compressor, the image processor can begin formatting data for a second image while the compressor is still compressing data for the first image. As a result, the delay between generating the first image and the second image is reduced.

Figure 7:
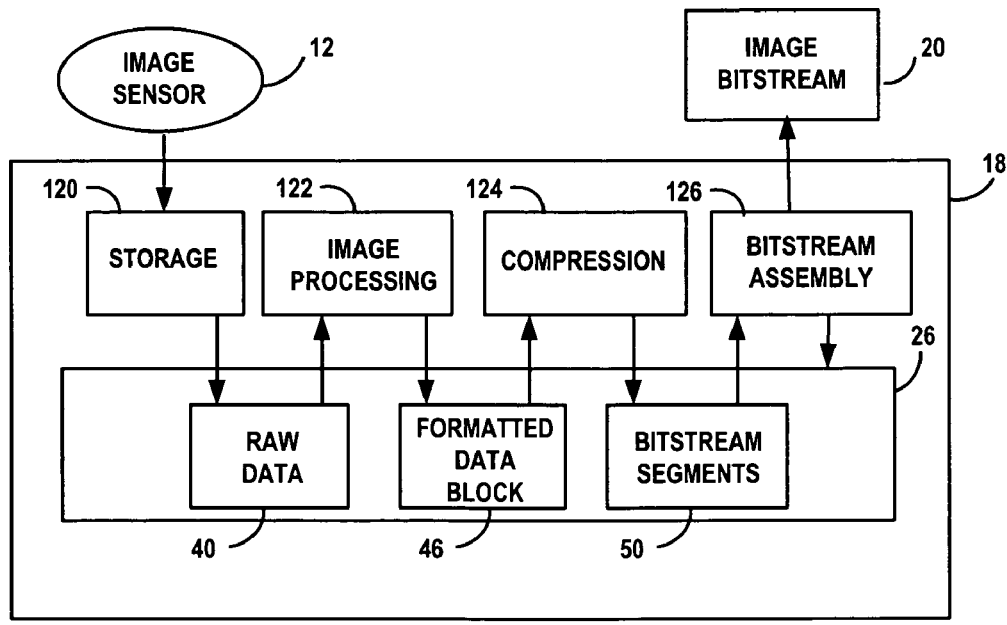
FIG. 7 is a logic flow diagram showing logic modules for processing image data in an imaging system.

FIG. 7 is a logic flow diagram showing logic modules for processing data from an image sensor. The electronics 18 include a storage module 120 configured to receive and store raw image data 40. For instance, the storage module 120 can receive the raw image data 40 from the image sensor 12 and store the raw image data 40 in the memory 26. The electronics 18 also include an image processing module 122 configured to format the raw image data 40 into formatted data blocks 46. For instance, the image processing module 122 can read portion of the raw image data 40 from the memory, convert the raw image data 40 into a formatted data block 46, write the formatted data block 46 to the memory, and read another portion of the raw image data 40 from the memory. The electronics 18 also include a compression module 124 configured to compress the formatted data blocks 46 into bitstream segments 50. For instance, the compression module 124 can read a formatted data block 46 from the memory, compress the formatted data block 46 so as to generate one or more compressed bitstream segments 50, and write the one or more compressed bitstream segments 50 to the memory. The electronics 18 also include a bitstream assembly module 126 configured to assemble the bitstream segments 50 into an image bitstream from which the image can be re-created. For instance, the bitstream assembly module 126 can read the bitstream segments 50 from the memory in the sequence that is needed to assemble the image bitstream and write the unit bitstreams to memory in the desired sequence. The memory to which the image bitstream is written can be the memory and/or the supplemental memory 20.

Although the imaging system is disclosed in the context of JPEG image compression, the compression can be a different type of compression and the compressor can be a different type of compressor. Although the imaging system is disclosed in the context of YCbCr image formatting, the imaging system can employ other image formats.

Although the illustrations above show an image partitioned into three blocks, the image can be partitioned into more than three blocks or into as few as two blocks. However, if the image is partitioned into only two blocks, each buffer in a pong-pong buffer would hold half the image and there would not be substantial savings in memory since the memory requirements of a ping-pong buffer would be the same as if the entire image had been stored in the memory. Accordingly, partitioning the image into three or more blocks is preferred when it is desirable to reduce the required memory.

Although the image is shown partitioned into vertical blocks, the image can be partitioned into horizontal blocks. Alternately, the image can be partitioned both horizontally and vertically. Accordingly, the methods and techniques can be employed in conjunction with an image that is horizontally and/or vertically partitioned into blocks.

Although the blocks of data are described as being written to a ping-pong buffer and as being read from a ping-pong buffer, a ping-pong buffer is not required and other memory devices can be employed in place of the ping-pong buffer.

The methods and operations described in this application are described in the context of a single image component. Much of the above discussion needs to be repeated for each image component. A common image format is the YCbCr format. This format contains a Y component, a Cb component, and a Cr component. Each unit described above is specific to the Y component, the Cb component, or the Cr component. As a result, the methods and operations described in this application can be repeated for each of the components in order to create a "true color" image or a "true color JPEG."

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, modules, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module and/or logic module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An imaging system comprising:
   an image processor configured to convert raw data for an image to formatted data for the image, wherein the formatted data for the image is partitioned into a plurality of blocks that each include a plurality of units; and
   an image compressor configured to compress the formatted data for the image,
   wherein the image compressor is configured to begin compressing one of the blocks of the formatted data concurrently with the image processor converting the raw data for another of the blocks, and wherein the image compressor is configured to compress the units of each of the blocks in a sequence that is a function of a degree of rotation desired for the image.

2. The system of claim 1, wherein the formatted data includes YCbCr data and compressing the formatted data includes JPEG encoding the formatted data.

3. The system of claim 1, wherein each of the blocks of formatted data includes formatted data for a plurality of pixels.

4. The system of claim 1, wherein the image processor sequentially writes the plurality of blocks to a memory, each of the blocks of formatted data including formatted data for a plurality of pixels.

5. The system of claim 1, wherein the plurality of units comprise plurality of minimum code units (MCUs) associated with JPEG encoding.

6. The system of claim 1, wherein the image processor converts the raw data to formatted data for each of the blocks in series.

7. The system of claim 4, wherein the memory includes a ping-pong buffer and the formatted data for each of the blocks is written into a buffer in the ping-pong buffer.

8. The system of claim 4, wherein the compressor reads the formatted data for one of the blocks from the memory and begins compressing the formatted data in that block concurrently with the image processor formatting raw image data for another of the blocks.

9. The system of claim 1, wherein the compressor begins compressing the formatted data in a first block concurrently with the image processor formatting raw image data for another block.

10. The system of claim 9, wherein the compressor is configured to compress the formatted data in the first block differently depending on a desired degree of rotation of the image.

11. The system of claim 10, wherein compressing the formatted data in the first block includes generating one or more bitstream segments that each includes a restart marker.

12. The system of claim 10, wherein compressing the formatted data in the block includes generating a plurality of bitstream segments that each includes a restart marker.

13. The system of claim 3, wherein the compressor compresses the formatted data in each of the blocks, and wherein compressing the formatted data in one of the blocks includes generating one or more bitstream segments that each includes a restart marker.

14. The system of claim 13, wherein the compressor combines each of the bitstream segments into a compressed image bitstream from which the image can be generated.

15. The system of claim 3, wherein the compressor compresses different units in series, the sequence in which the units are compressed being a function of the desired rotation of the image.

16. The system of claim 15, wherein each unit of formatted data is a minimum code unit employed in JPEG compression.

17. An imaging system, comprising:
    an image processor configured to format raw data for an image into blocks of YCbCr data and sequentially write the blocks of YCbCr data to a memory, each block of YCbCr data including a plurality of minimum code units (MCUs);
    a JPEG encoder configured to sequentially read the blocks of YCbCr data from the memory and to JPEG encode the minimum code units (MCUs) in a block so as to generate one or more bitstream segments that each include a re-start marker and one or more unit bitstreams,
    each unit bitstream being a JPEG encoded bitstream for one of the minimum code units (MCUs) in the block,
    the minimum code units (MCUs) in a block being JPEG encoded in a sequence that is a function of a degree of rotation desired for the image,
    the minimum code units (MCUs) being JPEG encoded concurrently with the raw data being formatted; and
    electronics for assembling the bitstream segments into an image bitstream from which the image can be regenerated.

18. The imaging system of claim 17, wherein the memory includes a plurality of buffers and the image processor alternates the buffer to which it writes each block and the compressor alternates the buffer from which it receives each block.

19. An imaging system, comprising:
    means for formatting raw data for an image into blocks of formatted data, each block of formatted data being partitioned into a plurality of units; and
    means for compressing the units of formatted data concurrently with formatting the raw data, wherein the means for compressing the units compresses the units in a sequence that is a function of a degree of rotation desired for the image.

20. The system of claim 19, wherein the means for formatting raw data sequentially writes each block of formatted data to a memory and the means for compressing the units sequentially reads each block of formatted data from the memory.

21. The system of claim 20, wherein
    the memory includes a ping-pong buffer having a plurality of buffers, and the means for formatting raw data alternates the buffer to which it writes each block, and the means for compressing the units alternates the buffer from which it receives each block.

22. The system of claim 19, wherein the means for compressing the units generate one or more bitstream segments for each block, each bitstream segment including a re-start marker and one or more unit bitstreams, each unit bitstream being a compressed bitstream for one of the units in the block.

23. The system of claim 22, further comprising:

means for assembling the bitstream segments into an image bitstream from which the image can be re-created.

24. A computer-readable storage medium comprising computer-executable instructions, wherein the instructions upon execution by a processor cause a machine to:

convert raw data for an image to formatted data for the image, wherein the formatted data for the image is partitioned into a plurality of blocks and wherein the blocks are written to a memory;

receive the blocks of formatted data from the memory, the formatted data in a block being partitioned into a plurality of units, the blocks being received from the memory sequentially; and compress the units of formatted data in a sequence that is a function of a degree of rotation desired for the image, wherein compressing the units of formatted data for a first block occurs concurrently with converting raw data to formatted data for a second block.

25. A method of processing image data, comprising:

converting raw data for an image to formatted data for the image, wherein the formatted data for the image is partitioned into a plurality of blocks;

writing the blocks to a memory;

receiving the blocks of formatted data from the memory, the formatted data in each of the blocks being partitioned into a plurality of units, the blocks being received from the memory sequentially; and compressing the units of formatted data in a first block of the blocks in a sequence that is a function of a degree of rotation desired for the image, wherein compressing the units of formatted data for the first block occurs concurrently with converting raw data to formatted data for a second block.

26. The method of claim 25, wherein formatted data is in YCbCr format and compressing the units of formatted data includes JPEG encoding the YCbCr data.

* * * * *

UNITED STATES PATENT AND TRADEMARK OFFICE
CERTIFICATE OF CORRECTION

| | | |
|---|---|---|
| PATENT NO. | : 7,742,644 B2 | Page 1 of 1 |
| APPLICATION NO. | : 11/414044 | |
| DATED | : June 22, 2010 | |
| INVENTOR(S) | : Hwang et al. | |

It is certified that error appears in the above-identified patent and that said Letters Patent is hereby corrected as shown below:

Column 13, line 28, claim 1: "include" to read as --includes--

Column 14, line 34, claim 17: "include" to read as --includes--

Column 14, line 38, claim 17: "a block" to read as --the block--

Signed and Sealed this
Fifth Day of July, 2011

David J. Kappos
*Director of the United States Patent and Trademark Office*